United States Patent [19]
Doublet

[11] 3,751,623
[45] Aug. 7, 1973

[54] PROCESS AND DEVICE FOR PRODUCING THIN WALLED OR EXTRA-THIN WALLED SMOOTH TUBES BY WELDING

[75] Inventor: Fernand Noel Doublet, La Croix St. Leu, France

[73] Assignee: Societe Anonyme Tubest, Paris, France

[22] Filed: June 9, 1971

[21] Appl. No.: 151,317

[30] Foreign Application Priority Data
June 12, 1970  France ............................ 7021596

[52] U.S. Cl. ..................... 219/67, 29/482, 219/105
[51] Int. Cl. ............................................. B23k 31/06
[58] Field of Search ........ 219/59-67, 158, 160, 161, 8.5, 105; 228/5; 29/482

[56] References Cited
UNITED STATES PATENTS

| 3,075,484 | 1/1963 | Benteler | 228/17 X |
| 2,306,945 | 12/1942 | Hebron | 219/105 X |
| 2,716,691 | 8/1955 | Bowman | 219/60 R |
| 2,654,014 | 9/1963 | Schaefer | 219/60 R |

*Primary Examiner*—J. V. Truhe
*Assistant Examiner*—L. A. Schutzman
*Attorney*—Greene & Durr

[57] ABSTRACT

A process and apparatus for thin-walled tubes from strips having a thickness of 0.03 – 0.7 mm, for example, wherein the tube blank formed by curving the strip is continuously moved past a stationary electrode to weld the same.

13 Claims, 8 Drawing Figures

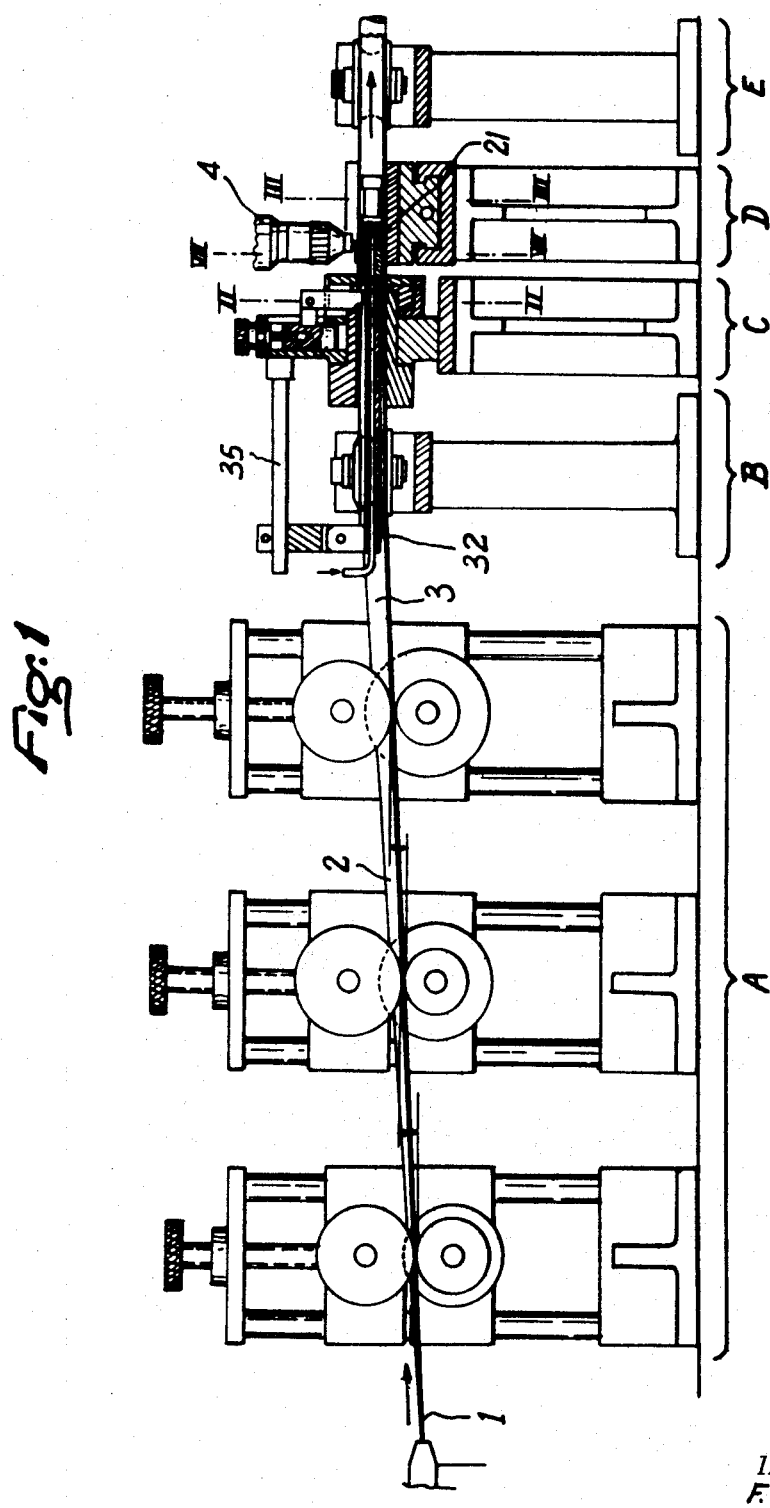

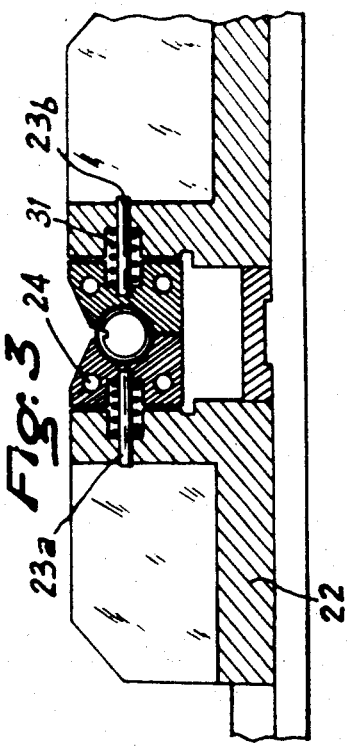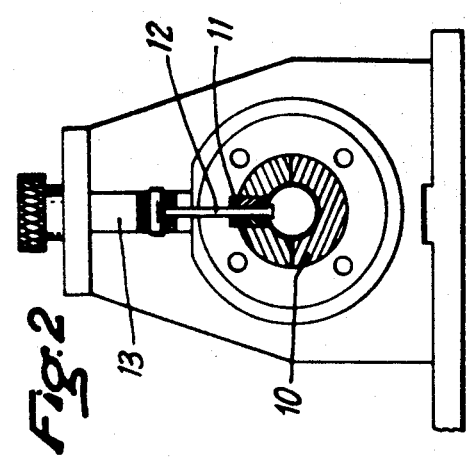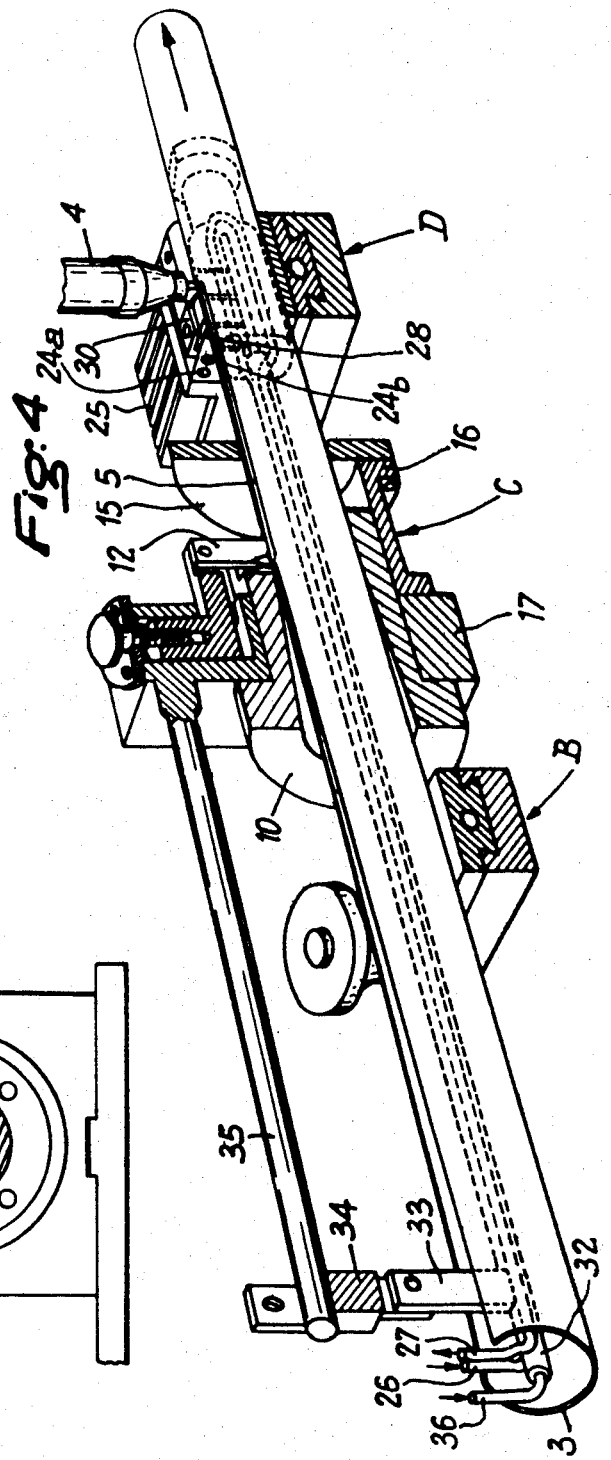

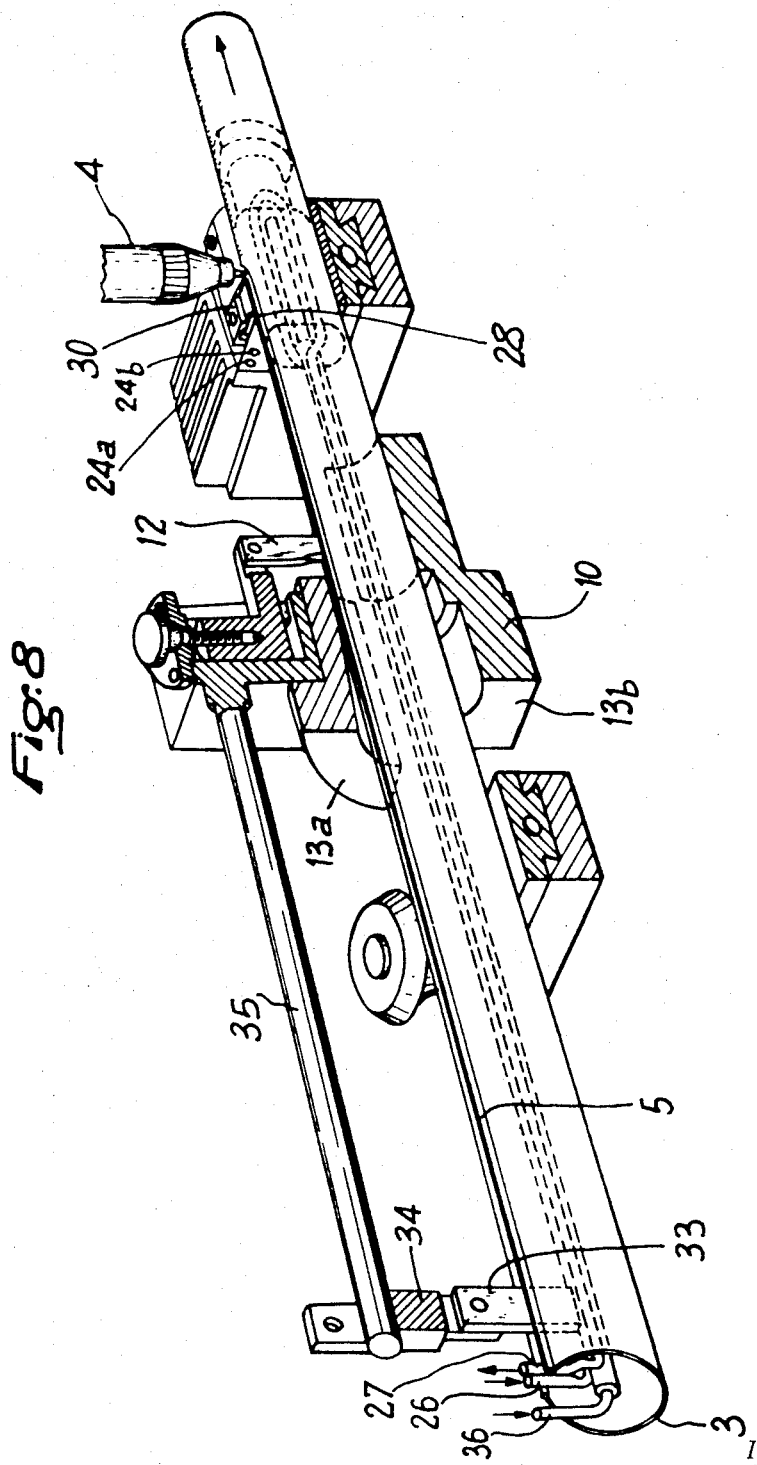

PROCESS AND DEVICE FOR PRODUCING THIN WALLED OR EXTRA-THIN WALLED SMOOTH TUBES BY WELDING

CROSS REFERENCE TO RELATED APPLICATION

Applicant's prior application, Ser. No. 878,279, filed Nov. 20, 1969, now U.S. Pat. No. 3,610,863, issued on Oct. 5, 1971, entitled "APPARATUS FOR THE PRODUCTION OF THIN METAL TUBES" discloses a similar process and apparatus except that in said prior application, the welding electrode is moved longitudinally along the tube blank. Such tubes are disclosed to be high quality tubes suitable in particular for processing into corrugated pipes, for example, by hydroforming.

This invention relates to improvements thereto, providing on the one hand, for a substantial simplification of the device, and on the other hand, for a substantial increase in production.

Essentially, the process, according to the invention is characterized in that, while using practically the same tube blank conformation and welding means as in the previously mentioned application, the production is carried out as a continuous operation, whereas, according to said application, operations were carried out in successive steps. The technical progress achieved is very significant. Indeed, all idle times involving the return of the welding torch to the starting position, and the tightening and loosening of the jaws seizing the tube blank, in disconnecting the arc, and in the opening and closing controls for protective gas pipes, which are to be effected at each advance step, are thus eliminated. The torch remains stationary and the tube blank goes by in front of it, at a constant speed, until the strip of sheet metal, which provides this tube blank, is used up. As the ends of rolls of sheet metal for the tube blank can be joined together, the length of the tube produced can be practically unlimited.

The characteristics of the invention will best appear from the description which will now be given of an embodiment shown simply by way of illustration in the appended drawings, in which:

FIG. 1 is an overall elevation and partial vertical longitudinal cross-sectional view of the machine;

FIG. 2 is a cross-sectional view to a larger scale, approximately along plane II—II of FIG. 1;

FIG. 3 is another section, approximately along plane III—III of that same figure;

FIG. 4 shows the main components of this machine, partly in perspective and partly as a vertical longitudinal section;

FIG. 8 is a view similar to that of FIG. 4, showing a varying embodiment.

The machine, according to the invention, comprises the following main components, listed in the order in which they go into operation.

a series of vertical forming roller pairs in an appropriate number, designated as A in FIG. 1, processing in a known manner a strip of sheet metal 1 provided by a feeding coil, not shown, first as a gutter 2 and then as a tube blank 3 open along its upper generatrix.

a pair of horizontal rollers designated as B, completing the conformation of the tube blank;

a die-conformator unit, designated as C;

a welding unit, designated as D, and which comprises essentially, according to the invention, and in addition to the known welding torch 4, two external half-shells and an internal support-distributor;

finally, a pair E of horizontal rollers designed to guide the welded tube which, as it exits from the machine, is seized and propelled continuously by a pair of caterpillars of known construction, not shown.

The pairs of forming rollers, considered individually, are not substantially different from those already described in the previously mentioned application, but, according to the invention, each pair is arranged at a level which is slightly higher than that of the preceding pair, in the direction of feed of the strip of sheet metal, so that the edges of the blank are subjected to a tensile stress. Applicant has indeed noted that, when forming the tube blank, its lower part travels, during its movement up to the die, over a shorter distance than its edges, thus leading to the formation of folds. This drawback is eliminated very simply by the arrangement adopted. The optimum slope to be given to the tube blank is determined by the relative location of the successive pairs of rollers which, to this effect, are vertically adjustable in their supporting cages, which are in turn horizontally adjustable with respect to one another.

The horizontal rollers B do not, by themselves, have any original characteristic. However, it should be mentioned that each of them is adjustable in the horizontal plane with great accuracy, through use of an appropriate micrometer screw device. It is indeed important that the two lips of the tube blank maintain between them the free passage of the end part of the support-distributor which will be described later, without being damaged in any way by the same.

Figure 7:
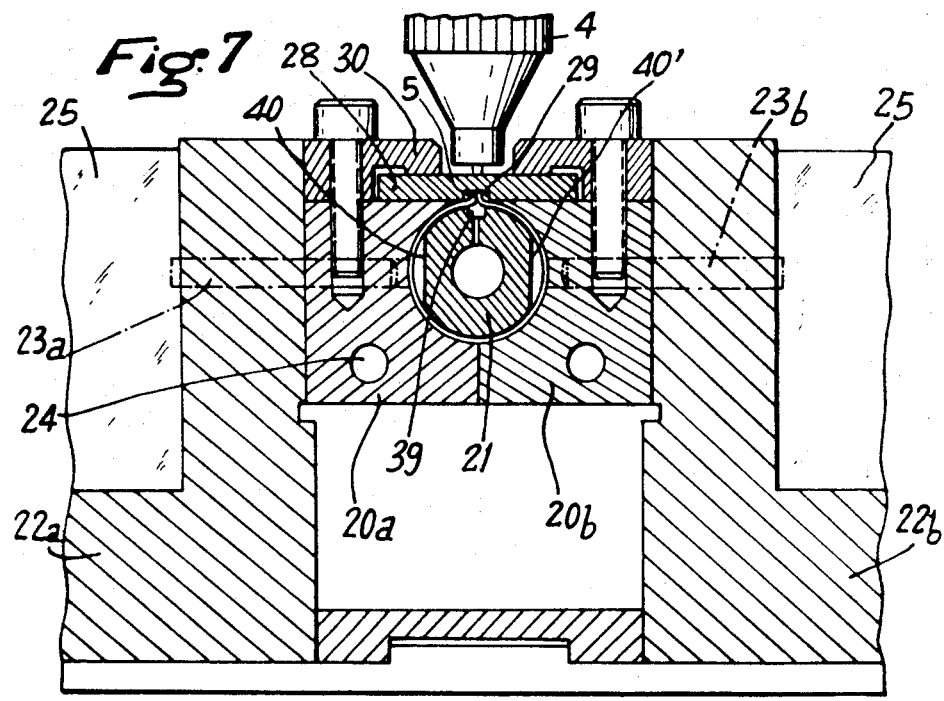
FIG. 7 is a sectional view, approximately along plane VII—VII of FIGS. 1 and 6.

The tube blank thus prepared then moves into the die conformator unit designated as a whole as C, which acts in a manner already described in the previous application, so as form thereon, on each edge, a joining lip 5 (see FIG. 7). However, and according to the invention, the conformation of the tube blank before welding can be provided for according to two different methods, to which correspond respectively FIGS. 2, 4 and 5, 8.

According to the first of these, die 10 is constructed in two parts, separated along a horizontal plane including the diameter. In a known manner, forming plates II made of treated metal reinforce the edges of the upper slit of the die, which is itself made of a material having a very low friction coefficient, and whose section continuously decreases between the inlet end and the outlet end of the latter, to act progressively on the tube blank and apply its edges on the conforming or lip forming boot 12 known from the previous application. The latter is hinged to a support 13, adjustable particularly in the vertical direction with great precision, by means of a micrometer screw.

In this first embodiment shown in FIGS. 2,4, the two parts of the die have their end faces in coincidence, as shown in FIG. 4, and the conforming boot 12 is housed and supported in the upper part of said die. It must indeed be perfectly maintained and guided, considering the high stresses to which it is subjected upon formation of the lips 5.

Figure 5:
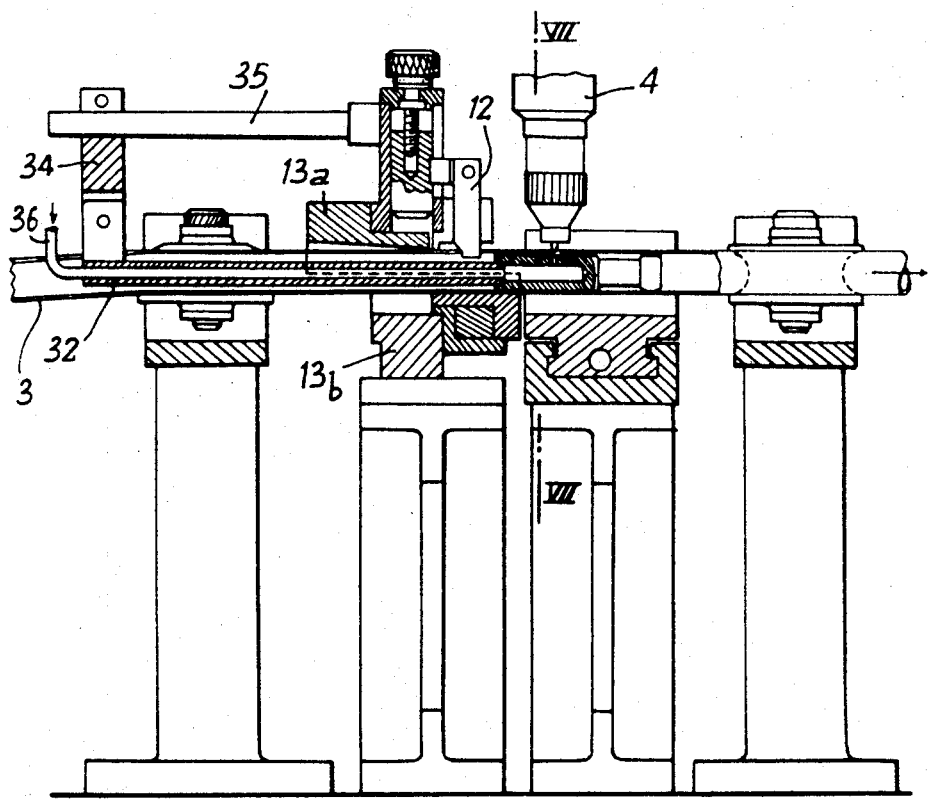
FIG. 5 is a partial view showing a vertical longitudinal section of an alternative embodiment of the invention.

In the second embodiment of the machine, shown in FIGS. 5 and 8, lips 5, instead of being completely obtained through cooperation of the die and the conforming boot 12, as mentioned above, are preformed by the rollers of unit A. Thus the conforming boot 12 now provides only for the completion of the lips, and it can therefore be positioned downstream of die 10, at a location where it will be completely unconstrained.

A disk 15 is fixed, at the outlet end of die 10, to a mounting 16 which is itself assembled to support 17 of the die, this disk forming, in order to correctly guide and maintain the tube blank 3 upon its entrance into welding unit D, a central circular opening whose diameter is practically equal to the external diameter of the tube blank, with a notch providing for the passage of the lips 5. It acts furthermore, as a shielding screen to prevent overheating of die 10 by the welding arc.

In the second embodiment, the die consists of two parts, 13a, 13b separated along a median horizontal plane (see FIGS. 5 and 8), its upper part 13a being shifted towards the upstream side of said die, together with the conforming boot 12 associated with it, thus moving them away from the electric arc of torch 4.

The tube blank thus conformed then passes into the welding unit itself, designated as D in FIG. 1. As shown in FIG. 7, it consists essentially of two half-shells 20a, 20b and of a support-distributor 21, between which the tube blank moves in a continuous motion, according to the invention. Half shells 20a, 20b are mounted in sliding supports 22a, 22b, which, through their transverse displacement controlled by any suitable means, not shown, provide for the accurate adjustment of these two half-shells with respect to the support-distributor.

According to another characteristic of the invention, half-shells 20a, 20b freely oscillate around horizontal pivotal axis 23a, 23b, thus providing for their self-orientation with respect to the tube blank 3, and thus facilitating its passage. Said sheels 20a, 20b are provided with bores or channels 24 in appropriate number and arrangement, for the circulation of a gaseous or liquid refrigerating fluid, so as to remove a substantial part of the heat given off during the welding operation. For the same purpose, supports 22a, 22b are provided with cooling fins or blades 25, which also provide for thermal dissipation. Inlet and outlet tubings for the refrigerating fluid, not shown, are connected to the corresponding half-shells channels, designated by 24a, 24b in FIG. 4.

Figure 6:
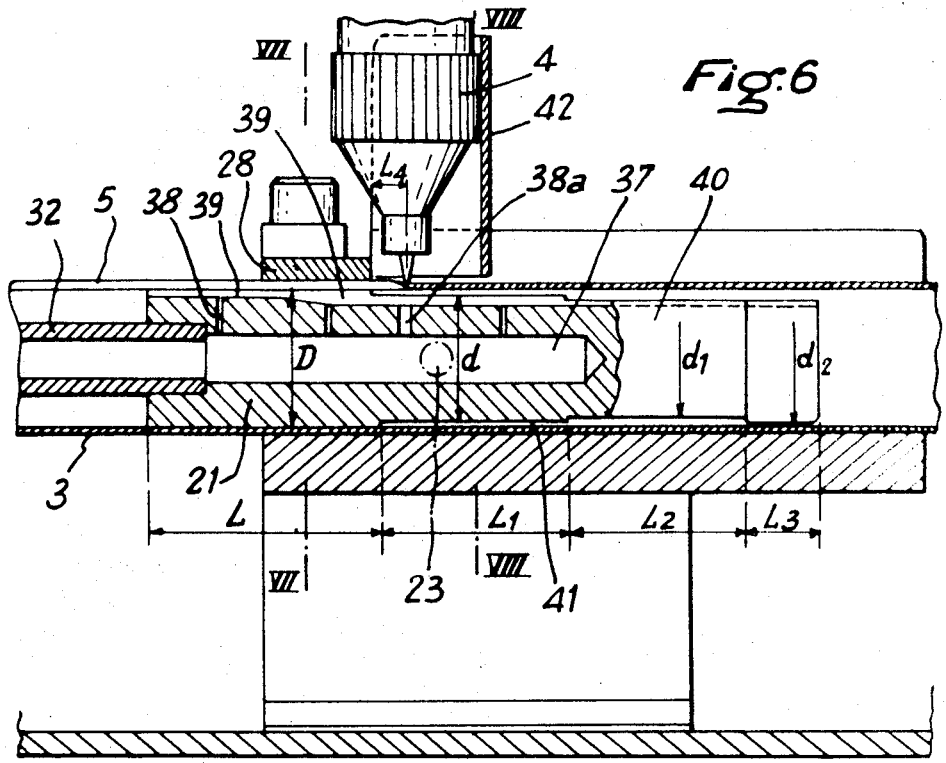
FIG. 6 is a partial vertical longitudinal sectional view to a larger scale.

Furthermore, a small horizontal plate 28 of treated steel comprising a groove 29 on its lower face (see FIG. 7), in which the two lips 5 of the tube blank 3 are engaged, is provided upstream of the welding torch 4, but in the direct vicinity of the latter; said plate being pressed against the upper face of half-shells 20a, 20b, by means of jaws 30 which are tightened by screws as shown in FIGS. 6 and 7. The plate 28 can also be provided in two parts which are contacting in the vertical welding plane.

Experience has shown that the surface condition of the half-shells 20a, 20b between which the tube blank passes, plays an important role in practice. They must be ground and polished with great care, so as to avoid gripping of the tube blank and contamination of the weld by particles of the metal of which these half-shells are made. They must also be made of a material which will eliminate any instability of the electric arc by magnetic blow out.

According to the invention, an elastic or resilient assembly of half-shells can also be provided, so that they can absorb expansions due to heating, while maintaining an accurate pressure contact on the lips of the blank. To this effect, and as shown in FIG. 3, the half-shells are maintained close to each other by compression springs 31 surrounding axles 23a, 23b and bearing, on the one hand, against supports 22 and, on the other hand, against said half-shells.

As already mentioned above, the tube blank is accurately guided, at the time of welding, by means of half-shells 20a, 20b and support-distributor 20, whose roles is very important, and which will now be described in greater detail, referring more particularly to FIG. 6. It is essentially intended to protect the inner side of the weld against oxydation by adequately localizing the protective gas, to prevent the collapse of the melted metal bath so as to ensure a smooth appearance of the weld, and also to contribute to thermal dissipation.

According to the invention, said support-distributor comprises a tubular body 21 fixes to the downstream end of a retaining tube 32 coaxial with the latter and which carries, in the vicinity of its upstream end, an end piece 33 (see FIG. 4 or 8) directed vertically upwards, passing between both edges of the tube blank 3. The length of tube 32 is chosen so that end piece 33 will be located in a zone in which these edges will be sufficiently far apart from each other so as not to risk any damage from the latter. This end piece is hinged to a fork 34 supported by a supporting rod 35 whose opposite end is attached to the frame of the machine in any appropriate manner. It is thus possible, by moving fork 34 on rod 35, to accurately adjust the longitudinal position of the support-distributor 21 with respect to torch 4. Moreover, the end piece 33 can freely oscillate around its axis of attachment to fork 34, so as to provide for the self-alignment of support-distributor 21 inside the tube blank.

Just like half-shells 20a, 20b, support-distributor 21 is bored with channels, not shown, designed for circulation of a refrigerating fluid which arrives therein through an inlet tubing 26 and is evacuated through an outlet tubing 27, as shown in FIG. 4.

According to the invention, retaining tube 32 is also used to feed support-distributor 21 with protective gas. To this end, it is connected through its upstream end to an inlet tubing 36 which, just like lines 26 and 27, pass through the upper slit of the tube blank 3.

Radial channels such as 38 (FIG. 6) communicate with the blind central bore 37 of support-distributor 21, said radial channels conducting the protective gas in a median longitudinal upper groove 39 corresponding to the weld seam.

It is very important practically to provide for a constant flow and good distribution of the protective gas, and this condition is satisfied, according to the invention, by suitably choosing not only the number and location of channels 38, but also the profile of groove 39, which is of a general trapezoidal section, and whose depth and width vary along its length, as a function, in particular, of the characteristics of the metal of which the tube blank 3 is made, and of the welding process adopted (for example TIG or Micro-plasma).

Just as half-shells 20a, 20b, the support-distributor 21 must also have an appropriate surface condition. For example, it will be chromed or polished, so as to avoid gripping and especially entrainment of particles of metal which would risk contaminating the weld.

Further, and according to the invention, said support-distributor has additional features, each of which contributes to the high quality of the weld obtained.

First of all, it comprises two diametrically opposed lateral flat surfaces 40, 40', (see FIG. 7) which reduce the friction of the tube blank, upon its passage against the same. Its external diameter D. over a certain length L (see FIG. 6), is very slightly greater than the internal diameter of the tube blank to be welded. Over another length L1, its external diameter d becomes smaller than the internal diameter of the tube blank. Over a third length L2, its external diameter d1 is still further reduced to a greater extent. Finally, over the last length L3, its external diameter d2 becomes equal again to diameter D. Channels 38 open into zones L and Li, and the zone Ll being that in which the welding is carried out. The size of channel 38a opening into this zone, straight beneath the welding torch 4, is greater than that of the other channels 38. The outlet opening of this channel 38a is at a minimal distance L4 from the rear edge of small plate 28, so as to avoid the initiation of an arc on the latter; however, the welding point is sufficiently close to this small plate to prevent any deformation of the metal through a thermal effect over this length L4, and thus provides for a good interfusion of the two lips 5.

As far as zone L2 is concerned, it forms an annular peripheral chamber in which the protective gas is retained, so as to provide both a deoxidizing and cooling action. Zone L3 partially closes the previously mentioned chamber, while providing for the measured evacuation of part of the hot protective gas. The channels for the circulation of the refrigerating fluid in the support-distributor 21 have not been shown; they can have any appropriate configuration and distribution.

As a simple illustrative example, in a machine constructed according to the invention, and having given complete satisfaction, the specifications of the support-distributor mentioned above were as follows, for the production of a tube with an internal diameter, $\phi$, of 15 mm:

L = 27 mm     D = $\phi$ + 2/10 mm
L1 = 23 mm     d = $\phi$ − 5/10 mm
L2 = 21 mm     d1 = $\phi$ − 10/10 mm
L3 = 9 mm     d2 = $\phi$ − 5/10 mm Small plate 28 comprises, at the upstream end of its median groove 29, a rounded edge not shown, facilitating the entry into said groove of lips 5 of the tube blank. The upper ends of these lips are thus maintained substantially in the same horizontal plane by said plate, in order to ensure the equal fusion of these two lips, which is indispensable for obtaining a good quality weld.

Finally, and as shown in FIG. 6, a screen 42 is arranged downstream of torch 4, so as to protect the welding electric arc from air currents, thus improving its stability.

It will be noted that the weld unit D of FIG. 1 comprises components with simple shapes, easy to assemble and which are interchangeable.

The operation of the device described and shown is as follows: the starting strip of sheet metal 1, passes through the forming roller unit A, progressively taking up a more and more pronounced shaped in the form of a gutter, there being no danger of any folding or wrinkling, due to the staggered position of the roller pairs. The horizontal rollers of the unit B then bring the edges of the strip of sheet metal already shaped in the form of a gutter closer together and prepare its entry into the conforming die unit C. In the latter unit, the conforming boot 12, in cooperation with the plates 11, acts to form the lips 5 on the edges of the strip of sheet metal preparatory to feeding to the welding bath, or it only completes said lips, if the latter have already been preformed on the edges of the strip by means, in particular, of appropriately shaped roller pairs.

The two half-shells 20a, 20b in weld unit D, in cooperation with support-distributor 21, then provide a precise approach of the lips toward each other, and the perfect alignment of said lips of the blank with respect to the electrode of torch 4. The support-distributor 21 also contributes to the guiding of the tube blank into the weld zone and, because of its very special shape, it provides, in addition, for an optimum distribution of the protective gas beneath the weld. It also participates in providing efficient cooling of the welded tube, as do also the half-shells 20a, 20b.

The combination of all these means makes it possible to obtain a weld whose quality is in no way inferior to that obtained by the means described in the previously mentioned prior application.

The significance of the improvements obtained will appear clearly from the two following numerical comparisons:

the cost of the welding unit constructed according to this invention is only one tenth of that of the reciprocating welding unit provided according to the previous application;

the production, with an identical starting strip of sheet metal, has been increased from 1.30 to 3m per minute.

It should be specified, finally, that the areas of application of the two machines under consideration are not identical. The device covered by the previous application, operating step by step, is more appropriate for the production of tubes with a diameter equal to or greater than 25 mm, because of the very elaborate guiding and holding members which it comprises. The one described and shown in the present application, which is simpler and more rapid, is particularly suitable for the production of tubes with a relatively small diameter.

Obviously numerous modifications of a constructive nature can be introduced, without departing from the scope of the invention, into the various components of the machine here described and shown by simple way of illustration.

I claim:

1. In a device for continuously producing smooth tubes having thin to extra-thin walls from a continuous strip of sheet metal of the type having a horizontally arranged series of roller pairs for forming the continuous strip first into a gutter and then into the outline of a tube with a circular section open at its upper part, additional means for forming an exterior oriented lip on each of edges at the upper part of said tube blank and means for aligning and welding said lips, the improvement comprising adjustable mounting means for a plurality of said pairs of forming rollers whereby the tube blank as it travels toward said welding means is made to travel along an upwardly sloping line to compensate for the difference in length of travel between the edge portions and the center portions of the strip, and means to introduce protective gas to the interior of the tube adjacent the lips of the tube blank in the region of the welding electrode.

2. The device as claimed in claim 1 wherein said roller pairs for forming the continuous strip include means for preforming the exterior oriented lips on the edge portions of the tube blank.

3. The device as calimed in claim 1 comprising tubular die means down-stream of the pairs of forming rollers, and boot means down-stream of said die means for forming the lips on the edge portions of the tube blank.

4. The device as claimed in claim 5 comprising tubular die means down-stream of the pairs of forming rollers, and boot means down-stream of said die means for completing the formation of the lips initiated by said roller pairs.

5. The device as claimed in claim 4 wherein said lip-preforming roller pairs include a final pair of rollers having vertical axes.

6. A device for continuously producing smooth tubes having thin to extra-thin walls from a continuous strip of sheet metal, of the type having a horizontally arranged series of roller pairs for forming the continuous strip first into a gutter and then into the outline of a tube with a circular section open at its upper part, comprising die means which includes means for forming a pair of exterior lips oriented with respect to each other on the respective edges of the tube blank, means for aligning said pair of lips and bringing them adjacent to one another, a stationary welding electrode adjacent said aligning means and positioned to operate on said aligned lips, means for continuously drawing the tube blank through the aligning means and past said stationary welding electrode, and means to introduce protective gas to the interior of said tube adjacent said lips in the region of said welding electrode.

7. The device of claim 9, wherein said means for forming the pair of exterior oriented lips comprises tubular die means down stream of the roller pairs for forming the tube blank and a boot means positioned down stream of said die means.

8. The device as claimed in claim 7 wherein said tubular die means comprises two portions separated along a diametrical horizontal plane, said boot means being attached to the upper portion of the tubular die means.

9. The device as claimed in claim 8 wherein the upper portion of said tubular die means is shifted upstream with respect to the lower portion thereof whereby to extend the distance between said upper portion and the welding electrode.

10. The device as claimed in claim 6, wherein the means for aligning said pair of lips comprises a pair of external half-shells surrounding the tube and positioned below the welding electrode, each of said half-shells being mounted to freely pivot about a horizontal axis.

11. The device as claimed in claim 10, wherein said pivotally mounted half-shells are resiliently mounted on their horizontal axes to urge the same together.

12. The device as claimed in claim 10 wherein said means for aligning said pairs of lips includes an upper plate, means for clamping said plate onto the pair of half-shells, said plate containing a median groove for engaging the two lips of the tube blank, said plate ending adjacent to the welding electrode.

13. The device as claimed in claim 10 wherein said half-shells contain bores for the circulation of cooling fluid, means for feeding cooling fluid through said bores.

* * * * *